US008515950B2

(12) United States Patent
Gao et al.

(10) Patent No.: US 8,515,950 B2
(45) Date of Patent: Aug. 20, 2013

(54) COMBINING LOG-BASED RANKERS AND DOCUMENT-BASED RANKERS FOR SEARCHING

(75) Inventors: Jianfeng Gao, Kirkland, WA (US); Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 12/243,678

(22) Filed: Oct. 1, 2008

(65) Prior Publication Data
US 2010/0082582 A1 Apr. 1, 2010

(51) Int. Cl.
*G06F 7/00* (2006.01)
*G06F 17/30* (2006.01)

(52) U.S. Cl.
USPC .......................................................... 707/723

(58) Field of Classification Search
USPC ............................ 707/999.005, 999.007, 723
See application file for complete search history.

(56) References Cited

U.S. PATENT DOCUMENTS

| 7,117,199 | B2 | 10/2006 | Frank et al. | |
|---|---|---|---|---|
| 7,925,657 | B1* | 4/2011 | Pfleger et al. | 707/751 |
| 2005/0055341 | A1 | 3/2005 | Haahr et al. | |
| 2006/0074910 | A1 | 4/2006 | Yun et al. | |
| 2007/0208730 | A1 | 9/2007 | Agichtein et al. | |
| 2007/0214131 | A1* | 9/2007 | Cucerzan et al. | 707/5 |
| 2007/0255689 | A1* | 11/2007 | Sun et al. | 707/3 |
| 2008/0133444 | A1 | 6/2008 | Gao et al. | |

OTHER PUBLICATIONS

Lebanon, et al., "Cranking: Combining Rankings Using Conditional Probability Models on Permutations", In Proceedings of the Nineteenth International Conference on Machine Learning, 2002, pp. 363-370.

Agichtein, et al., "Improving Web Search Ranking by Incorporating User Behavior Information", Proceedings of the 29th annual international ACM SIGIR conference on Research and development in information retrieval, Seattle, Washington, USA, 2006, pp. 19-26.
Liu, et al., "Supervised Rank Aggregation", Proceedings of the 16th international conference on World Wide Web, Banff, Alberta, Canada, 2007, pp. 481-489.
Huang, et al., "Relevant Term Suggestion in Interactive Web Search based on Contextual Information in Query Session Logs", Journal of the American Society for Information Science and Technology, vol. 54, Issue 7, May 2003, pp. 01-25.
Bilenko, et al., "Mining the Search Trails of Surfing Crowds: Identifying Relevant Websites From User Activity", Proceeding of the 17th international conference on World Wide Web, Beijing, China, 2008, pp. 51-60.
Bennett, et al., "Combining Probability-Based Rankers for Action-Item Detection", In Proceedings of HLT-NAACL 2007, Apr. 2007, Rochester, New York, pp. 324-331.
Jin, et al., "Ranking Refinement and Its Application to Information Retrieval", Proceeding of the 17th international conference on World Wide Web, Beijing, China, Apr. 21-25, 2008, pp. 397-406.

* cited by examiner

*Primary Examiner* — Alexey Shmatov
(74) *Attorney, Agent, or Firm* — Wolfe-SBMC (57) ABSTRACT

Log-based rankers and document-based rankers may be combined for searching. In an example embodiment, there is a method for combining rankers to perform a search operation. A count of query instances in log data is ascertained based on a query. A search for the query is performed to produce a set of search results. The set of search results is ranked by relevance score with a document-based ranker and a log-based ranker using a weighting factor that is adapted responsive to the count of the query instances in the log data.

20 Claims, 6 Drawing Sheets

COMBINING LOG-BASED RANKERS AND DOCUMENT-BASED RANKERS FOR SEARCHING

BACKGROUND

The amount of information being created and retained in the world continues to increase, seemingly at a geometric pace. Individuals take photographs and store them digitally. Corporations maintain databases of reports, presentations, and analyses. Furthermore, different entities of all types are making much of their information available via the Internet.

Although so much of the world's information is now accessible over the Internet, locating a desired item manually is extraordinarily difficult. Instead, search engines are usually used to find information generally and desired items specifically. Search engines review available information, which is a process often termed crawling with regard to the World Wide Web (WWW), to catalog the information into a search index.

A search index facilitates the acquisition of information generally and desired items specifically in an accurate and timely manner. Thus, a search index enables a search engine to locate information that may be of interest to a user. However, there is so much information today that many, many items may be located by a search engine. In the case of the internet, thousands, or even hundreds of thousands or more, items may be relevant or may appear to be relevant to a user's interest as expressed in a search query.

An issue for search engines therefore becomes one of ranking the relevant items. The items are hopefully ranked such that more relevant items are ranked higher than less relevant ones. Many search engines are now relatively proficient at finding items that are potentially relevant to a user's expressed interest. Unfortunately, search engines still often fail to rank relevant items in accordance with a user's level of interest in them. Especially when many potentially relevant items are located by a search engine, the inability to properly rank them can be disappointing and dissatisfying to users.

SUMMARY

Log-based rankers and document-based rankers may be combined for searching. In an example embodiment, there is a method for combining rankers to perform a search operation. A count of query instances in log data is ascertained based on a query. A search for the query is performed to produce a set of search results. The set of search results is ranked by relevance score with a document-based ranker and a log-based ranker using a weighting factor that is adapted responsive to the count of the query instances in the log data.

In another example embodiment, a system is capable of combining rankers to perform a search operation. The system includes log data, a search unit, and a ranker combining unit. The log data includes instances of respective query-identifier pairs and user interaction information from which associated respective relevance scores may be derived. The associated relevance scores are thus derived from the user interactions with search results. The search unit performs a search for a query to produce a set of search results. The ranker combining unit ranks the set of search results by relevance score with a document-based ranker and a log-based ranker using a weighting factor that is adapted responsive to a count of query-identifier pair instances that include the query in the log data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

As explained herein above, search engines often fail to rank relevant items in accordance with a user's actual level of interest in them. With existing approaches to searching, one type of search result ranker is typically employed. For example, a document-based ranker or a log-based ranker is usually employed to rank search results. Unfortunately, neither ranker type is ideal for use throughout the life cycle of a search query.

In contrast, for example embodiments that are described herein, the ranking of search results is performed by combining a document-based ranker and a log-based ranker. More specifically, a contribution of the log-based ranker to the ranking process may be increased as the amount or size of log data increases, particularly with respect to a submitted query.

By way of specific example, one or more processor-accessible tangible media include processor-executable instructions for combining rankers to perform a search operation. The processor-executable instructions, when executed, direct a system to perform the following acts. A count of query-identifier pair instances in log data is ascertained based on a query. A search for the query is performed to produce a set of search results. The set of search results is ranked by relevance score with a document-based ranker and a log-based ranker using a weighting factor that is adapted responsive to the count of the query-identifier pair instances in the log data. The weighting factor is adapted such that a relative contribution of the log-based ranker increases as the count of the query-identifier pair instances in the log data increases.

In an example implementation, the identifiers of the query-identifier pair instances may be uniform resource locators (URLs), and each of the identifiers may correspond to an item on an internet. In another example implementation, respective ones of the relevance scores may be respective probabilities associated with respective query-identifier pairs. In yet another example implementation, the weighting factor may be determined based on a predetermined function and responsive to the count of the query-identifier pair instances in the log data. Additional example embodiments and implementations are described further herein below.

Figure 1:
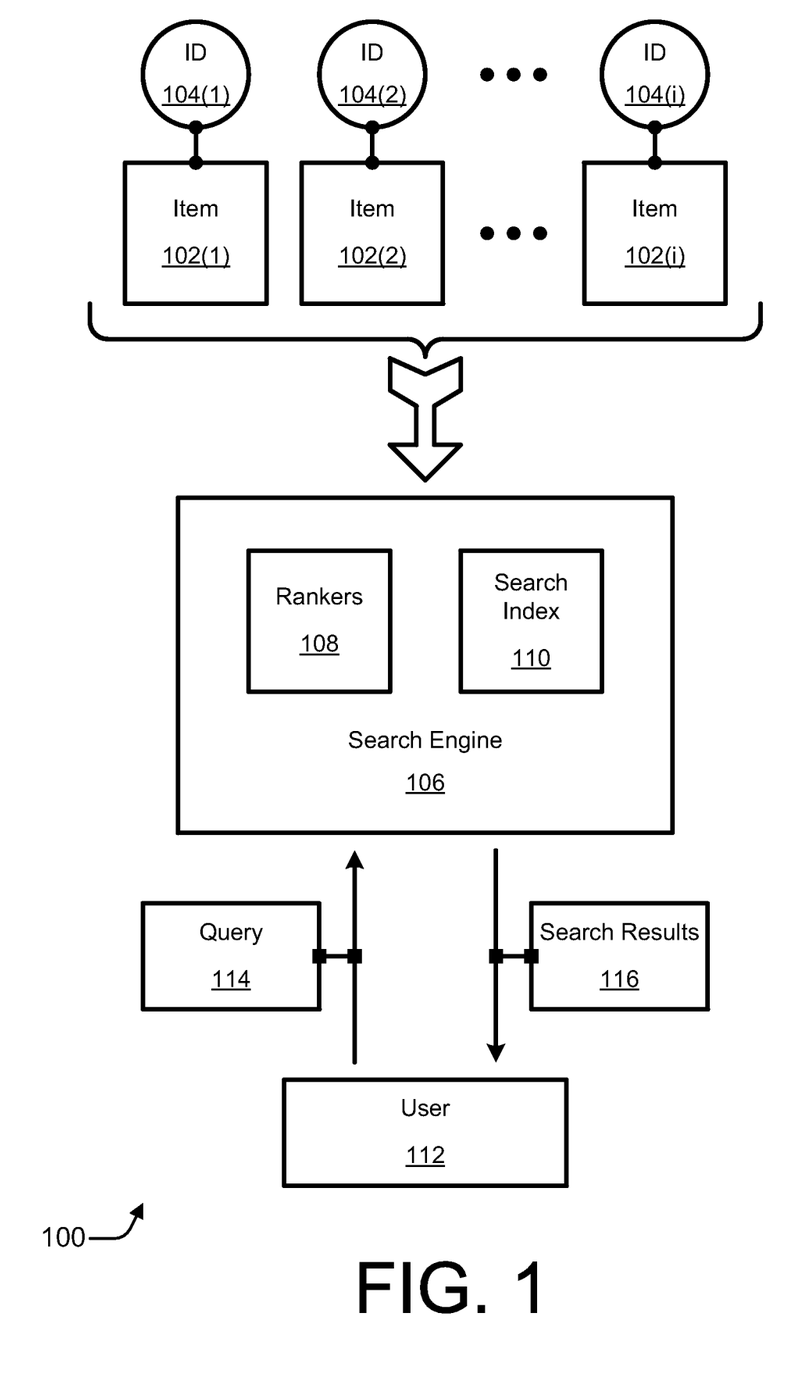
FIG. 1 illustrates an example general search paradigm.

FIG. 1 illustrates an example general search paradigm 100. As illustrated, search paradigm 100 includes multiple items 102, multiple identifiers 104, a search engine 106, and a user 112. More specifically, "i" items 102(1), 102(2) . . . 102(i) and identifiers 104(1), 104(2) . . . 104(i) are shown, with "i" representing a positive integer. Search engine 106 includes rankers 108 and a search index 110. In an example operation of search paradigm 100, user 112 sends or submits a query 114 to search engine 106. In response, search engine 106 transmits or returns a set of search results 116.

For example embodiments, each respective item 102 corresponds to a respective identifier (ID) 104. An item 102 may be, for example, a file generally, a document, a spreadsheet, an image, a public document format (PDF) file, an audio file, a video, some combination thereof, and so forth. The respective corresponding identifier 104 represents the respective item 102. Each identifier 104 may be, for example, a name, an address, a file path, some combination thereof, and so forth. For instance, with regard to the internet, an item 102 may be a web page, and an identifier 104 may be a URL.

Figure 2A:
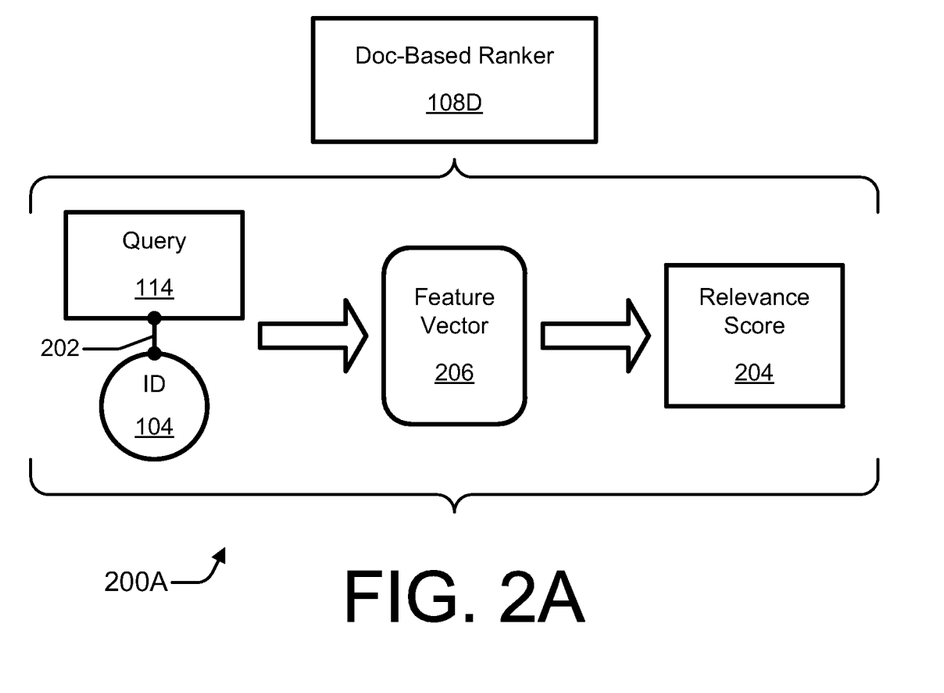
FIG. 2A is a block diagram depicting an example approach used by document-based rankers to obtain a relevance score.
Figure 2B:
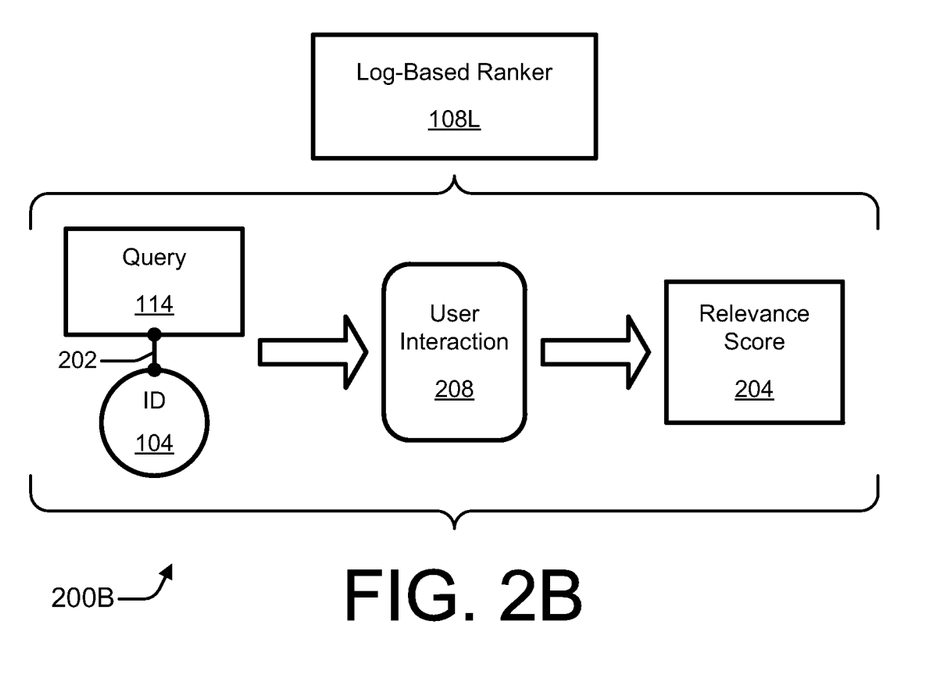
FIG. 2B is a block diagram depicting an example approach used by log-based rankers to obtain a relevance score.

To prepare for providing a search on items 102, search engine 106 accesses and reviews items 102. The review enables search engine 106 to catalog items 102 into search index 110. Search index 110 facilitates finding relevant items 102 relatively quickly during searches. Rankers 108 are components that enable relevant items 102 to be ranked, hopefully in a manner that reflects the interests of user 112. Examples for document-based rankers and log-based rankers are described herein below with particular reference to FIG. 2.

In an example operation, a user 112 submits query 114 to search engine 106. Typically, query 114 includes one or more words (including characters for languages based thereon). However, query 114 may include other content, such as images or sounds. Search engine 106 performs a search for query 114 with reference to search index 110 to retrieve a set of search results of items 102 (e.g., as represented by their corresponding identifiers 104). The search usually retrieves many items 102.

These many items 102 are then ranked by one or more rankers 108. The intention of a ranker 108 is to order the search results in accordance with the actual interests of user 112. The interests of user 112, which guide which items 102 the user considers more or most relevant, usually have to be inferred. They can be inferred from many sources. Example sources include, but are not limited to, the content of query 114, the content of items 102, the content of identifiers 104, popular trends, personal and global search histories, combinations thereof, and so forth. The ranked list of search results 116 is then returned to user 112.

FIG. 2A is a block diagram depicting an example approach 200A used by document-based rankers 108D to obtain a relevance score 204. Each coupling of a query 114 and an identifier 104 may be referred to as a query-identifier pair 202. Approach 200A therefore involves a query-identifier pair 202, a feature vector 206, and a relevance score 204. Feature vector 206 represents query-identifier pair 202. Generally, an example document-based ranker 108 may include two parts. One part is responsible for feature extraction to create feature vector 206 from query-identifier pair 202. The other part is responsible for scoring to assign feature vector 206 a relevance score 204 based on a pre-trained ranking model.

FIG. 2B is a block diagram depicting an example approach 200B used by log-based rankers 108L to obtain a relevance score 204. Approach 200B involves a query-identifier pair 202, one or more user interactions 208, and a relevance score 204. User interaction 208 reflects user interaction with regard to query-identifier pair 202 for previous search results that are retained in a search history log. The user interaction may be from the user submitting the query and/or other users.

Different types of rankers operate differently when ranking search results. The ranking entails ordering a set of returned identifiers 104 for a query 114 in such a way that relevant identifiers 104 are ranked higher than less relevant ones, which are ranked higher than irrelevant ones. The task of ranking is achieved by using a ranker that assigns a query-ID pair 202 a relevance score 204. Relevance scores 204 may be probabilistic, non-probabilistic, normalized (e.g., to between 0 and 1), non-normalized, a combination thereof, and so forth.

A ranker can be learned, for example, from user query-session log data in which for each query-ID pair 202, a count of user selections (e.g., clicks) is recorded. Rankers of this type are referred to herein as log-based rankers 108L. Unfortunately, log-based rankers 108L can suffer from a problem with data sparseness because many query-ID pairs are unseen or insufficiently present in the log data, especially early in the life cycle of a query.

Traditional information retrieval models, such as those based on a vector space model (VSM), result in rankers that do not suffer the same data sparseness problem. These traditional models use statistics derived from a query-ID pair 202 to compute the associated relevance score 204. Rankers of this type are referred to herein as document-based rankers 108D. However, document-based rankers 108D are usually sub-optimal because they do not take into account user log data. Moreover, they are not updated along with the migration of users' intentions as information topics and trends change.

For a particular query, document-based rankers 108D work well at the relatively early stage of the lifecycle of the query when the log data has very few query-ID pair 202 entries recorded therein. Log-based rankers 108L, on the other hand, work well at the relatively later stage of the query lifecycle when a sufficient number of query-ID pair 202 instances have been recorded. Thus, contributions from at least one document-based ranker 108D and at least one log-based ranker 108L can be combined so that the combined ranker mechanism works well over both relatively early and late stages of the query lifecycle.

More specifically, for example embodiments of document-based rankers 108D, they assign a relevance score 204 to a query-ID pair 202 using statistics derived from the pair itself (including the corresponding item 102) without reference to log data of user interactions. The statistics are incorporated into feature vector 206. A well-known example of a document-based ranker is the TF-IDF ranker (and its variants). It uses term frequency (TF) and inverse document frequency (IDF) to compute the relevance score. TF is defined as the number of times a given query term appears in the item (e.g., in the webpage located by a URL type of ID). IDF is a measure of the general importance of the term. It should be understood that document-based ranker 108D may be realized with other type(s) of implementations instead of or in addition to a TF-IDF ranker.

Document-based rankers 108D are robust overall, and in general they perform reasonably well. However, document-based rankers are "static". They cannot be optimized easily even when a lot of log data has been accumulated. Consequently, they are insensitive to the changing intentions of users, which is particularly common with regard to World Wide Web (WWW) searches.

More specifically, for example embodiments of log-based rankers 108L, they assign a relevance score 204 to a query-ID pair 202 using statistics derived from user interactions 208 recorded to log data. A query-session log is an example of log data. A query session log may include, for instance: (1) a user query and (2) a ranked list of retrieved IDs, each with click information. Click information may include, for example, whether the ID is clicked by the user and/or how much time the user focuses on the item corresponding to the ID, which is often referred to in search literature as the dwell time.

For popular large-scale web search engines, for example, billions of query sessions may be logged every day. From such a large amount of query session log data, it can be estimated for each query-ID pair the probability that the ID (and its corresponding item) is judged as relevant by users. This probability is denoted herein by P(R|query-ID).

This probability may be estimated through one or more of any of a number of different mechanisms. Example mechanisms for determining a relevance score with a log-based ranker 108L include, but are not limited to: click-through rate, dwell time, probability of being skipped, a combination thereof, and so forth. With regard to the probability of being skipped, such a mechanism measures by way of estimation the likelihood of the ID being not selected (i.e., of being "skipped") by the user for a given query.

When there are sufficient number of query-ID pair instances in the log data, a ranker can use the estimated P(R|query-ID) as the relevance score for ranking each ID given the query. Such a ranker may also be updated as more log data is being accumulated. As mentioned above, a weakness of a pure log-based ranker 108L is the data sparseness problem. This problem persists because, despite having large amounts of log data, there are still new or rarely-seen query-ID pairs 202 whose relevance scores 204 cannot be adequately estimated reliably from the log data.

Figure 3:
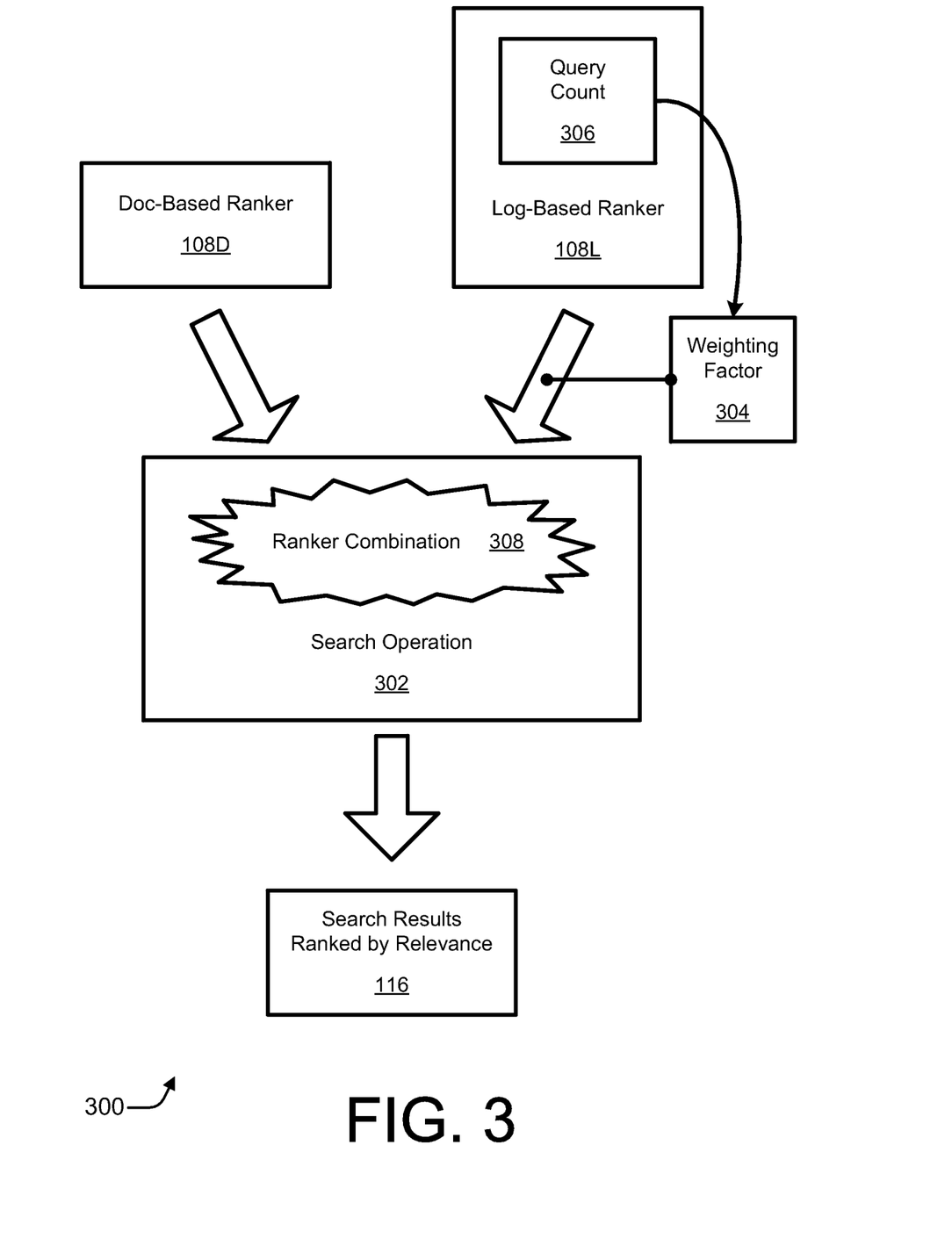
FIG. 3 is a general block diagram of an example search operation that combines a log-based ranker and a document-based ranker.

FIG. 3 is a general block diagram 300 of an example search operation 302 that combines a log-based ranker 108L and a document-based ranker 108D. As illustrated, block diagram 300 includes search operation 302, document-based ranker 108D, log-based ranker 108L, search results 116 as ranked by relevance, and weighting factor 304. Log-based ranker 108L includes a query count 306. Search operation 302 includes a ranker combination 308.

For example embodiments, a search engine employs at least one document-based ranker 108D and at least one log-based ranker 108L. With search operation 302, contribution(s) from one or more document-based rankers 108D and contribution(s) from one or more log-based rankers 108L are combined with ranker combination 308. Generally, ranker combination 308 is effectuated using weighting factor 304 that is adapted responsive to query count 306. Using a combination of document-based ranker 108D and log-based ranker 108L, search results 116 are ranked by relevance.

Ranker combination 308 may involve any one or more different combination techniques. In other words, a contribution from document-based ranker 108D and a contribution from log-based ranker 108L may be combined using any one or more of the following combination techniques: a linear combination, a log-linear combination, a geometric mean combination, a probability space combination (e.g., Kullback-Leibler, etc.), some combination thereof, and so forth.

In an example implementation, log-based ranker 108L is adapted to ascertain query count 306. Query count 306 is a count of query instances in log data. The log data reflects past user interactions in searches with regard to the submitted query. Weighting factor 304 is adapted responsive to query count 306. For example, weighting factor 304 may be adapted such that the contribution of log-based ranker 108L increases as query count 306 increases. Equivalently, weighting factor 304 may be adapted such that the contribution of document-based ranker 108D decreases as query count 306 increases.

In an example embodiment, query count 306 reflects a count of a number of instances that a query-identifier pair 202 appears in log data. Because the count of the number of instances that a query-identifier pair 202 appears in the log data reflects a number of user interactions with that query-identifier pair 202 in previous search episodes, the count of the number of instances can also be considered to reflect the strength or reliability of the contribution from log-based ranker 108L as compared to the contribution from document-based ranker 108D.

Figure 4:
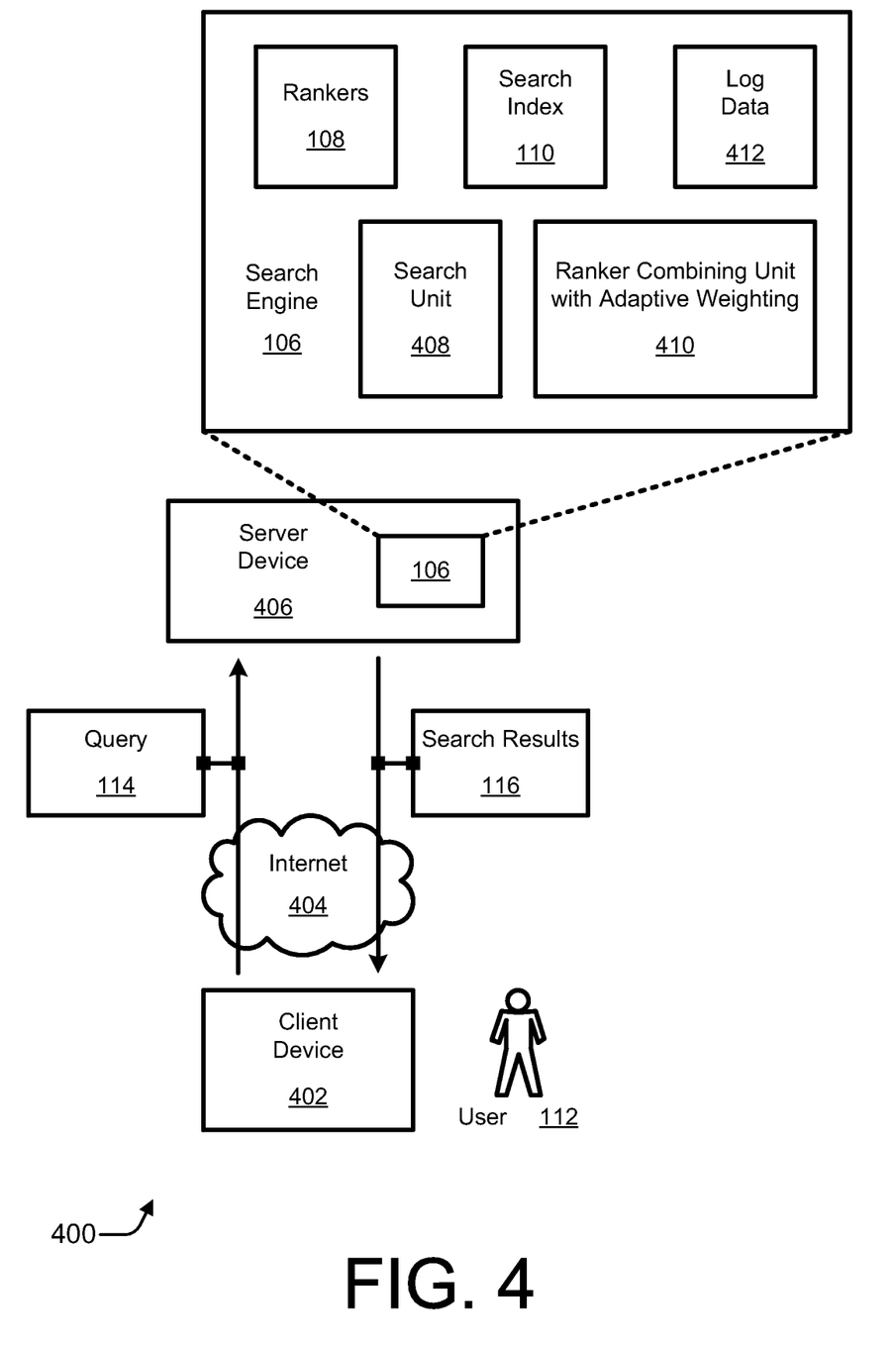
FIG. 4 is a block diagram of an example usage scenario and an example search engine that is capable of combining log-based rankers and document-based rankers.

FIG. 4 is a block diagram of an example usage scenario 400 and an example search engine 106 that is capable of combining log-based rankers and document-based rankers. As illustrated, usage scenario 400 includes a client device 402, an internet 404, and a server device 406 in addition to user 112, query 114, and search results 116. Search engine 106 includes search unit 408, ranker combining unit 410 with adaptive weighting, and log data 412 in addition to rankers 108 and search index 110.

For certain example embodiments, user 112 enters query 114 at client device 402. Query 114 is sent to server device 406 over internet 404. A search operation is performed at server device 406 with search engine 106. The search operation may include locating items that are relevant to query 114 and ranking the located items in accordance with relevance scores for query-identifier pairs. Search results 116 as ranked by relevance are transmitted to client device 402 via internet 404. User 112 may then access search results 116 at client device 402.

Search engine 106 includes or has access to search unit 408, ranker combining unit 410 with adaptive weighting, log data 412, rankers 108, and search index 110. Log data 412 includes the data logged from previous user interactions with the search engine. As described herein above, log data 412 may include multiple instances of query-identifier pairs 202. Search unit 408 is adapted to perform a search on search index 110 with reference to query 114. Ranker combining unit 410 is adapted to perform ranker combination 308 (of FIG. 3) using a weighting factor 304 that is adapted responsive to a count of the query instances in log data 412.

Thus, for example embodiments, a system is capable of combining rankers 108 to perform a search operation 302 (of FIG. 3). The system includes log data 412, a search unit 408, and a ranker combining unit 410. Log data 412 includes instances of respective query-identifier pairs 202 and user interaction 208 information from which associated respective relevance scores 204 may be derived. Relevance scores 204 are thus derived from user interactions 208 with the search results.

Search unit 408 performs a search operation 302 for a query 114 to produce a set of search results. Ranker combining unit 410 ranks the set of search results by relevance score with a document-based ranker 108D and a log-based ranker 108L using a weighting factor 304 that is adapted responsive to a count 306 of query-identifier pair 202 instances that include query 114 in log data 412.

In an example implementation, ranker combining unit 410 may adapt weighting factor 304 such that a contribution of document-based ranker 108D is adaptively decreased as count 306 of query-identifier pair 202 instances that include query 114 in log data 412 increases. In another example implementation, ranker combining unit 410 may adapt weighting factor 304 such that a contribution of log-based ranker 108L is adaptively increased as count 306 of query-identifier pair 202 instances that include query 114 in log data 412 increases.

As described herein above, relevance score 204 may be probabilistic or non-probabilistic. When probabilistic, each of relevance scores 204 may be a probability value that is associated with each respective query-identifier pair 202. Also, search unit 408 may be a neural network, which typically operates on probabilities.

It should be understood that the ranker combining principles described herein are applicable to many different usage scenarios in addition to usage scenario 400. For example, search engine 106 may be distributed across multiple devices (e.g., multiple server devices 406). Also, a local network (e.g., a local area network (LAN), wireless LAN (WLAN), etc.) may be used instead of internet 404. A user 112 may alternatively interact "directly" with search engine 106 at server device 406. Additionally, search engine 106 may target relatively local items such that search services are for desktop search (e.g., as part of an operating system or other application), are for a database search (e.g., as part of a database or data sharing program), some combination thereof, and so forth. Other usage scenarios are also possible.

Figure 5:
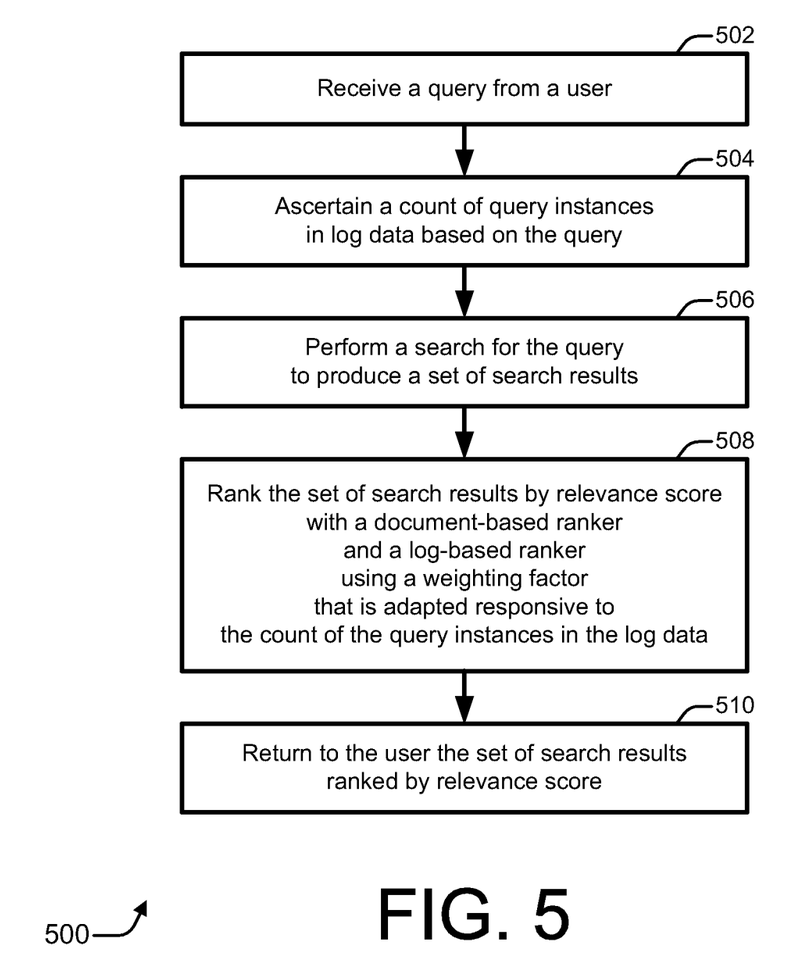
FIG. 5 is a flow diagram that illustrates an example of a method for combining log-based rankers and document-based rankers for searching.

FIG. 5 is a flow diagram 500 that illustrates an example of a method for combining log-based rankers and document-based rankers for searching. Flow diagram 500 includes five blocks 502-510. Implementations of flow diagram 500 may be realized, for example, as processor-executable instructions and/or as part of search engine 106 (of FIGS. 1 and 4), including at least partially by a search unit 408 and/or a ranker combining unit 410.

Figure 6:
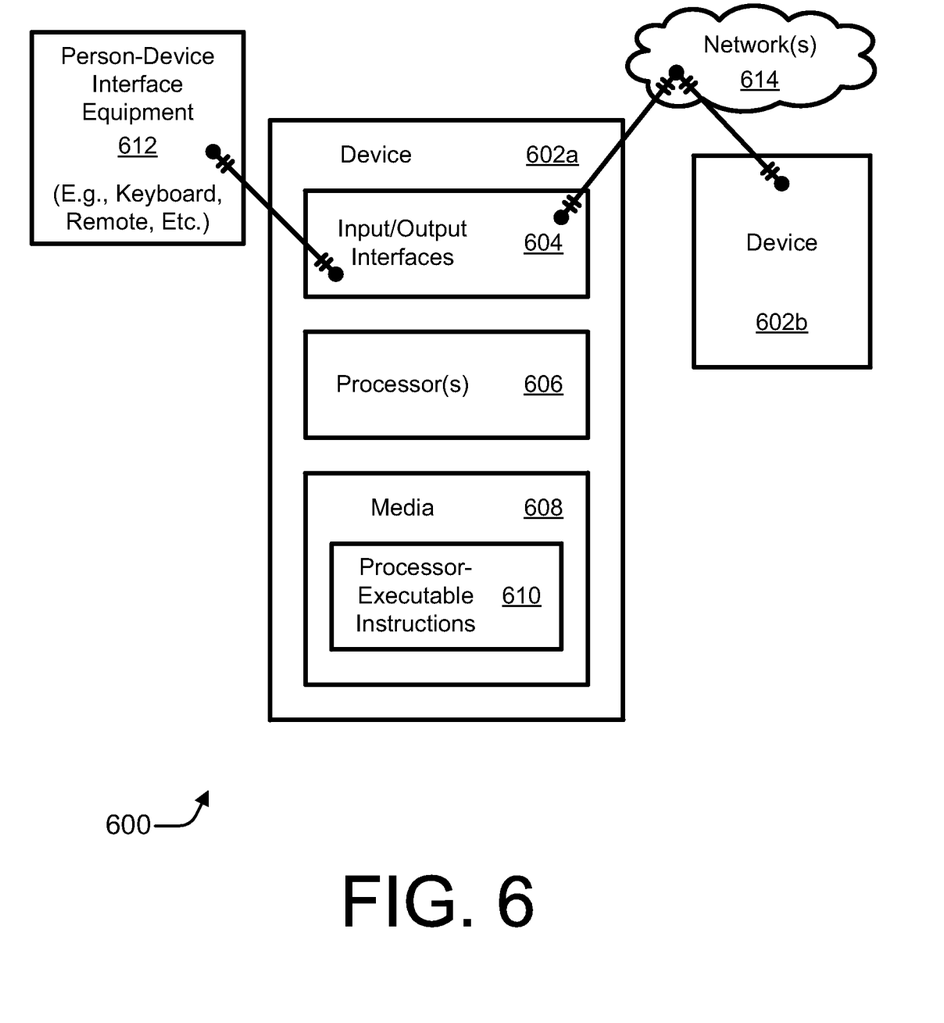
FIG. 6 is a block diagram illustrating example devices that may be used to implement embodiments for combining log-based rankers and document-based rankers for searching.

The acts of flow diagram 500 that are described herein may be performed in many different environments and with a variety of different systems, such as by one or more processing devices (e.g., of FIG. 6). The order in which the method is described is not intended to be construed as a limitation, and any number of the described blocks can be combined, augmented, rearranged, and/or omitted to implement a respective method, or an alternative method that is equivalent thereto.

For example embodiments, there is a system-implemented method for combining rankers to perform a search operation. At block 502, a query is received from a user. At block 504, a count of query instances in log data is ascertained based on a query. At block 506, a search is performed for the query to produce a set of search results.

At block 508, the set of search results is ranked by relevance score with a document-based ranker and a log-based ranker using a weighting factor that is adapted responsive to the count of the query instances in the log data. At block 510, the set of search results is returned to the user. The returned set of search results is thus ranked by relevance score from a combination of the document-based ranker and the log-based ranker.

Additional example implementations are described below. For instance, the count for query-identifier pair instances in the log data may be ascertained based on the query. Also, each of the relevance scores for the set of search results may be a probability value associated with each respective query-identifier pair. Especially when the relevance scores are probability values, the search may be performed for the query using a neural network.

Additional example implementations may entail the following: The document-based ranker and the log-based ranker may be combined using any one or more of the following combination techniques: a linear combination, a log-linear combination, a geometric mean combination, a probability space combination, some combination thereof, and so forth.

Additionally, the document-based ranker and the log-based ranker may be combined using a feature vector in which the log-based ranker contributes to the ranking by relevance score in accordance with the weighting factor. Also, the weighting factor may be adapted such that a relative contribution of the log-based ranker is proportional to a size of the count of the query instances in the log data.

The following provides a relatively quantitative example implementation. In this example, the relevance scores are probabilistic, the search engine functions as a neural network, and the combining technique is a linear combination. Although the weighting factor is applied to the contribution from the document-based ranker, it may alternatively be applied to the contribution from the log-based ranker from an inverse perspective.

In this example implementation, both rankers are combined using a Bayesian prior. Let $P_l$ and $P_d$ denote the relevance probabilities (e.g., normalized relevance scores) assigned by a log-based ranker and a document-based ranker, respectively. The combined ranker may therefore be of the form provided by Equation (1):

$$P_r(q,url) = (1-\alpha)P_l(q,url) + \alpha P_d(q,url), \quad 0 \leq \alpha \leq 1. \quad (1)$$

The relevance probabilistic value $P_r$ is a weighted combination of the log-based probability $P_l$ and the document-based probability $P_d$, and $\alpha$ determines how much weight the document-based ranker receives. The weighting factor $\alpha$ is a function of the count of the query-ID pairs in the log data. The larger the query count is, the smaller the value $\alpha$ is set to because when a sufficient number of query-ID pair instances have been accumulated, the log-based probability $P_l$ is increasingly more likely to be reliably estimated. The weighting factor $\alpha$ is a function that can be estimated from the log data.

The following is a specific example approach of how a function $\alpha$ may be estimated, but other approaches may alternatively be implemented. It is assumed, by way of example only, that the function $\alpha$ follows an exponential distribution: $\alpha = f(x;\lambda) = \lambda e^{-\lambda x}$. In this exponential distribution, $x \geq 0$ is the query count of the query-ID pairs, and $\lambda \geq 0$ is a parameter to be tuned. This tuning parameter is often called the rate parameter.

It is given that there is set of query-ID pairs whose relevance scores are reliably estimated from a large amount of recorded query-ID pairs. These relevance probabilities are thus $P_r = P_l$. The tuning process entails gradually reducing the number x of query-ID pair samples and then re-estimating the log-based probability $P_l$, which is denoted as $P_l^x$. The document-based probability $P_d$ is independent of the number of samples and remains the same.

Now, for each total number of query-ID pair instances x, the "optimal" $\alpha^x$ can be estimated by mathematically optimizing the following Equation (2):

$$\alpha^x = \operatorname{argmin}_\alpha \sum_{q,url} (P_r(q,url) - ((1-\alpha)P_L^x(q,url) + \alpha P_d(q,url)))^2. \quad (2)$$

The $\alpha$ function $f(x;\lambda)$ can be determined by fitting the rate parameter $\lambda$ as shown in Equation (3):

$$\lambda = \mathrm{argmin}_\lambda \sum_x (\alpha^x - f(x, \lambda))^2. \quad (3)$$

The above approach can be analogized to the Empirical Bayesian methods. The $\alpha P_d(q, \mathrm{url})$ portion of Equation (1) functions like a prior, and the parameters of the prior are estimated from the data (as in the Empirical Bayesian methods), rather than being pre-specified (as in the classical or ordinary Bayesian methods).

FIG. 6 is a block diagram 600 illustrating example devices 602 that may be used to implement embodiments for combining log-based rankers and document-based rankers for searching. As illustrated, block diagram 600 includes two devices 602a and 602b, person-device interface equipment 612, and one or more network(s) 614. As explicitly shown with device 602a, each device 602 may include one or more input/output interfaces 604, at least one processor 606, and one or more media 608. Media 608 may include processor-executable instructions 610.

A search-related system generally may be formed from one or more devices 602. With reference to usage scenario 400 (of FIG. 4) and by way of example only, server device 406 may be realized with device 602a, and client device 402 may be realized with device 602b. Each may also be realized with more than one device 602. With usage scenario 400, internet 404 may correspond to network(s) 614. It should be noted that systems and/or devices for searching with combined rankers as described herein may be localized or distributed (e.g., over one or more server farms and/or data centers). Thus, but by way of example only, search unit 408 and log data 412 may be located at different geographic locations and/or machines.

For example embodiments, device 602 may represent any processing-capable device. Example devices 602 include personal or server computers, hand-held or other portable electronics, entertainment appliances, network components, data storage components, some combination thereof, and so forth. Device 602a and device 602b may communicate over network(s) 614. Network(s) 614 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 612 may be a keyboard/keypad, a touch screen, a remote, a mouse or other graphical pointing device, a display screen, a speaker, and so forth. Person-device interface equipment 612 may be integrated with or separate from device 602a.

I/O interfaces 604 may include (i) a network interface for monitoring and/or communicating across network 614, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 612. A given interface may function as both a display device interface and a person-device interface.

Processor 606 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 608 may be any available media that is included as part of and/or is accessible by device 602. It includes volatile and non-volatile media, removable and non-removable media, storage and transmission media (e.g., wireless or wired communication channels), hard-coded logic media, combinations thereof, and so forth. Media 608 is tangible media when it is embodied as a manufacture and/or as a composition of matter.

Generally, processor 606 is capable of executing, performing, and/or otherwise effectuating processor-executable instructions, such as processor-executable instructions 610. Media 608 is comprised of one or more processor-accessible media. In other words, media 608 may include processor-executable instructions 610 that are executable by processor 606 to effectuate the performance of functions by device 602. Processor-executable instructions 610 may be embodied as software, firmware, hardware, fixed logic circuitry, some combination thereof, and so forth.

Thus, realizations for combining log-based rankers and document-based rankers for searching may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 608 comprises at least processor-executable instructions 610. Processor-executable instructions 610 may comprise, for example, all or a portion of search engine 106 (of FIGS. 1 and 4). Generally, processor-executable instructions 610, when executed by processor 606, enable one or more devices 602 to perform the various functions described herein. Such functions include, by way of example, those that are illustrated in flow diagram 500 (of FIG. 5) and those pertaining to features illustrated in the various block diagrams, as well as combinations thereof, and so forth.

The devices, acts, features, functions, methods, modules, data structures, techniques, components, etc. of FIGS. 1-6 are illustrated in diagrams that are divided into multiple blocks and other elements. However, the order, interconnections, interrelationships, layout, etc. in which FIGS. 1-6 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for combining log-based rankers and document-based rankers for searching.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible media comprising processor-executable instructions for combining rankers to perform a search operation, wherein the processor-executable instructions, when executed, direct a system to perform acts comprising:

ascertaining a count of a number of instances that a respective query-identifier pair from among multiple query-identifier pair entries corresponding to a query is recorded in log data, the count of the number of instances of the respective query-identifier pair reflecting a number of user interactions with the respective query-identifier pair that are associated with previous submissions of the query by users;

performing a search for the query to produce a set of search results; and ranking the set of search results by relevance score by combining scores from a document-based ranker and a log-based ranker into a combined score using a weighting factor that is adapted as a function of the count of the number of instances of the respective query-identifier pair corresponding to the query recorded in the log data such that a relative contribution of the document-based ranker to the combined score decreases as the count of the number of instances of the respective query-identifier pair in the log data increases.

2. The one or more processor-accessible tangible media as recited in claim 1, wherein the identifiers of the query-identifier pair entries comprise uniform resource locators (URLs), and wherein each of the identifiers corresponds to an item on an internet.

3. The one or more processor-accessible tangible media as recited in claim 1, wherein respective relevance scores comprise respective probabilities associated with respective query-identifier pairs.

4. The one or more processor-accessible tangible media as recited in claim 1, wherein the processor-executable instructions, when executed, direct the system to perform a further act comprising:

determining the weighting factor based on a predetermined function and responsive to the count of the number of instances of the respective query-identifier pair in the log data.

5. A method implemented by a system for combining rankers to perform a search operation, the method comprising acts of:

ascertaining a count of a number of instances of a respective query-identifier pair from among multiple query-identifier pairs in log data based on a query that reflects entries recorded in the log data responsive to user interactions with the respective query-identifier pair that are associated with previous submissions of the query by users;

performing a search for the query to produce a set of search results; and ranking the set of search results by relevance score with a document-based ranker and a log-based ranker using a weighting factor that is adapted as a function of the number of the instances of the respective query-identifier pair in the log data to decrease a contribution of the document-based ranker to the relevance score relative to the log-based ranker as the count of the number of instances of the respective query-identifier pair increases.

6. The method as recited in claim 5, further comprising: receiving the query from a user; and returning to the user the set of search results as ranked by relevance score from a combination of the document-based ranker and the log-based ranker.

7. The method as recited in claim 5, wherein the log data comprises a query-session log that includes the query and a ranked list of retrieved IDs, each ID having click information.

8. The method as recited in claim 5, wherein each of the relevance scores for the set of search results comprises a probability value associated with each respective query-identifier pair.

9. The method as recited in claim 8, wherein the act of performing comprises:

performing the search for the query using a neural network.

10. The method as recited in claim 5, wherein the act of ranking comprises:

combining the document-based ranker and the log-based ranker using any one or more of the following combination techniques: a linear combination, a log-linear combination, a geometric mean combination, or a probability space combination.

11. The method as recited in claim 5, wherein the act of ranking comprises:

combining the document-based ranker and the log-based ranker using a feature vector in which the log-based ranker contributes to the ranking by relevance score in accordance with the weighting factor.

12. The method as recited in claim 5, wherein the weighting factor comprises a function with an exponential distribution.

13. The method as recited in claim 5, wherein the act of ranking comprises:

adapting the weighting factor such that a relative contribution of the log-based ranker is proportional to a size of the count of the number of instances of the respective query-identifier pair in the log data.

14. A system that is capable of combining rankers to perform a search operation, the system comprising:

one or more processors;

one or more processor-accessible tangible media storing instructions executable via the one or more processors to implement:

a data log to maintain log data that includes instances of respective query-identifier pairs and user interaction information from which associated respective relevance scores may be derived, each query-identifier pair recorded to reflect a submission of a corresponding query by a user;

a search unit to perform a search for a particular query to produce a set of search results; and a ranker combining unit to rank the set of search results by relevance score by combining scores from a document-based ranker and a log-based ranker into a combined score for each query-identifier pair using a weighting factor that is adapted as a function of a count of instances of a respective query-identifier pair that includes the particular query in the log data as the count changes, the weighting factor being adapted by at least decreasing a contribution of the document-based ranker to the combined score of the respective query-identifier pair as the count of the instances of the respective query-identifier pair in the log data increases.

15. The system as recited in claim 14, wherein the associated relevance scores are derived from the user interaction information with search results from the log data using any one or more of the following log-based mechanisms: click-through rate, dwell time, or probability of being skipped.

16. The system as recited in claim 14, wherein the ranker combining unit is further configured to combine the contribution from the document-based ranker and a contribution from the log-based ranker using any one or more of the following combination techniques: a linear combination, a log-linear combination, a geometric mean combination, or a probability space combination.

17. The system as recited in claim 14, wherein the ranker combining unit is further configured to adapt the weighting factor such that a contribution of the log-based ranker to the combined score is adaptively increased as the count of the instances of the respective query-identifier pair in the log data increases.

18. The system as recited in claim 14, wherein each of the relevance scores comprises a probability value associated with each respective query-identifier pair.

19. The system as recited in claim 18, wherein the search unit comprises a neural network.

20. The system as recited in claim 14, wherein the document-based ranker is further configured to:
   create a feature vector from the respective query-identifier pair; and
   assign the feature vector a unique relevance score based on a pre-trained ranking model.

* * * * *